(12) United States Patent
Grover et al.

(10) Patent No.: US 12,255,998 B2
(45) Date of Patent: Mar. 18, 2025

(54) PROTECTING SENSITIVE INFORMATION BASED ON AUTHENTICATION FACTORS

(71) Applicant: MICRO FOCUS LLC, Santa Clara, CA (US)

(72) Inventors: Douglas Max Grover, Rigby, ID (US); Alexander Hoole, Vancouver (CA); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 198 days.

(21) Appl. No.: 17/709,061

(22) Filed: Mar. 30, 2022

(65) Prior Publication Data

US 2023/0143395 A1 May 11, 2023

Related U.S. Application Data

(60) Provisional application No. 63/276,988, filed on Nov. 8, 2021.

(51) Int. Cl.
*H04L 9/08* (2006.01)
*G06F 21/31* (2013.01)
(Continued)

(52) U.S. Cl.
CPC ............ *H04L 9/0897* (2013.01); *G06F 21/31* (2013.01); *G06F 21/44* (2013.01); *G06F 21/602* (2013.01); *H04L 9/0822* (2013.01); *H04L 9/0877* (2013.01)

(58) Field of Classification Search
CPC ..... H04L 9/088; H04L 9/0877; H04L 9/0844; H04L 9/0897; H04L 9/3247;
(Continued)

(56) References Cited

U.S. PATENT DOCUMENTS 9,565,074 B2 2/2017 Lehane
9,673,975 B1 * 6/2017 Machani ............... H04L 9/0822
(Continued)

FOREIGN PATENT DOCUMENTS

KR 20100094232 A 8/2010
KR 101039975 B1 6/2011
WO WO-2015136800 A1 * 9/2015 ............. G06F 21/31

OTHER PUBLICATIONS

U.S. Appl. No. 17/702,680, filed Mar. 23, 2022, Alexander Hoole, et al.

*Primary Examiner* — Kyung H Shin
(74) *Attorney, Agent, or Firm* — Sheridan Ross P.C.

(57) ABSTRACT

Sensitive information is identified. For example, the sensitive information may be a set of medical records. A request is received to send the sensitive information from a first domain to a second domain. For example, the request may be to send the sensitive information from a first corporation to a second corporation. The sensitive information is encrypted. The encrypted sensitive information comprises an authentication field. The authentication field identifies one or more authentication factors that are required to unencrypt the sensitive information. For example, the authentication field may indicate that a user is required to provide a username/password and a fingerprint scan to access the sensitive information. The encrypted sensitive information is sent to the second domain. The user in the second domain is required to authenticate using the one or more authentication factors to access the sensitive information.

18 Claims, 7 Drawing Sheets

(51) Int. Cl.
*G06F 21/44* (2013.01)
*G06F 21/60* (2013.01)

(58) Field of Classification Search
CPC ..... H04L 9/0825; H04L 9/0822; H04L 9/085;
H04L 9/0863; H04L 9/16; H04L 9/3226;
G06F 9/4406; G06F 21/31; G06F 21/602;
G06F 12/14; G06F 21/72
See application file for complete search history.

(56) References Cited

U.S. PATENT DOCUMENTS

| | | |
|---|---|---|
| 9,930,025 B2 | 3/2018 | Oberheide |
| 10,033,700 B2 | 7/2018 | Ouye |
| 2011/0191599 A1* | 8/2011 | Chou .................... H04L 9/0877 |
| | | 713/193 |
| 2012/0278430 A1 | 11/2012 | Lehane |
| 2016/0285847 A1 | 9/2016 | Oberheide |
| 2022/0060323 A1* | 2/2022 | Payne .................... H04L 9/0897 |
| 2022/0078194 A1 | 3/2022 | Grover |

* cited by examiner

PROTECTING SENSITIVE INFORMATION BASED ON AUTHENTICATION FACTORS

CROSS REFERENCE TO RELATED APPLICATION

The present application claims the benefits of U.S. Provisional Application Ser. No. 63/276,988, filed Nov. 8, 2021, entitled "Protecting Sensitive Information Based on Authentication Levels", which is incorporated herein by this reference in its entirety.

Cross reference is made to U.S. patent application Ser. No. 17/014,120, filed Sep. 8, 2020, entitled "DYNAMIC LEVEL AUTHENTICATION/ENCRYPTION", which is incorporated herein by this reference in its entirety.

FIELD

The disclosure relates generally to multi-factor authentication and particularly to enforcing multi-factor authentication between domains.

BACKGROUND

As the need for increased security becomes more prevalent, companies and enterprises are now starting to require a higher degree of authentication based on what applications that are being accessed. For example, some applications are starting to require multi-factor authentication. This allows for improved security at the application level. However, multi-factor authentication at the application level is very limited.

SUMMARY

These and other needs are addressed by the various embodiments and configurations of the present disclosure. The present disclosure can provide several advantages depending on the configuration. These and other advantages will be apparent from the disclosure contained herein. Sensitive information is identified. For example, the sensitive information may be a set of medical records. A request is received to send the sensitive information from a first domain to a second domain. For example, the request may be to send the sensitive information from a first corporation to a second corporation. The sensitive information is encrypted. The encrypted sensitive information comprises an authentication field. The authentication field identifies one or more authentication factors that are required to unencrypt the sensitive information. For example, the authentication field may indicate that a user is required to provide a username/password and a fingerprint scan to access the sensitive information. The encrypted sensitive information is sent to the second domain. The user in the second domain is required to authenticate using the one or more authentication factors to access the sensitive information.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium or non-transitory computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, the term "domain" may include an application, a user of an application, a network, an entity (e.g., a corporation, a partnership, etc.), a person, a device, and/or the like. The term "between domains" may include between two or more applications, between two or more networks, between two or more entities (e.g., between corporations), between two or more persons, between two or more devices, between two or more user accessing the same application and/or device, and/or the like.

As described herein and in the claims the term "authentication factor" may include any type of authentication factor that identifies a user, such as, a username/password, a user question, fingerprint scan (e.g., using minutia points and/or pore points), an iris scan, a facial print scan, a vein scan, a wrinkle scan, a palm scan, a voiceprint, Short Message Service (SMS) authentication (e.g., send a code via SMS), an email message authentication (e.g., send a code via email), a mobile device authentication application (e.g., approve an authentication message), and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
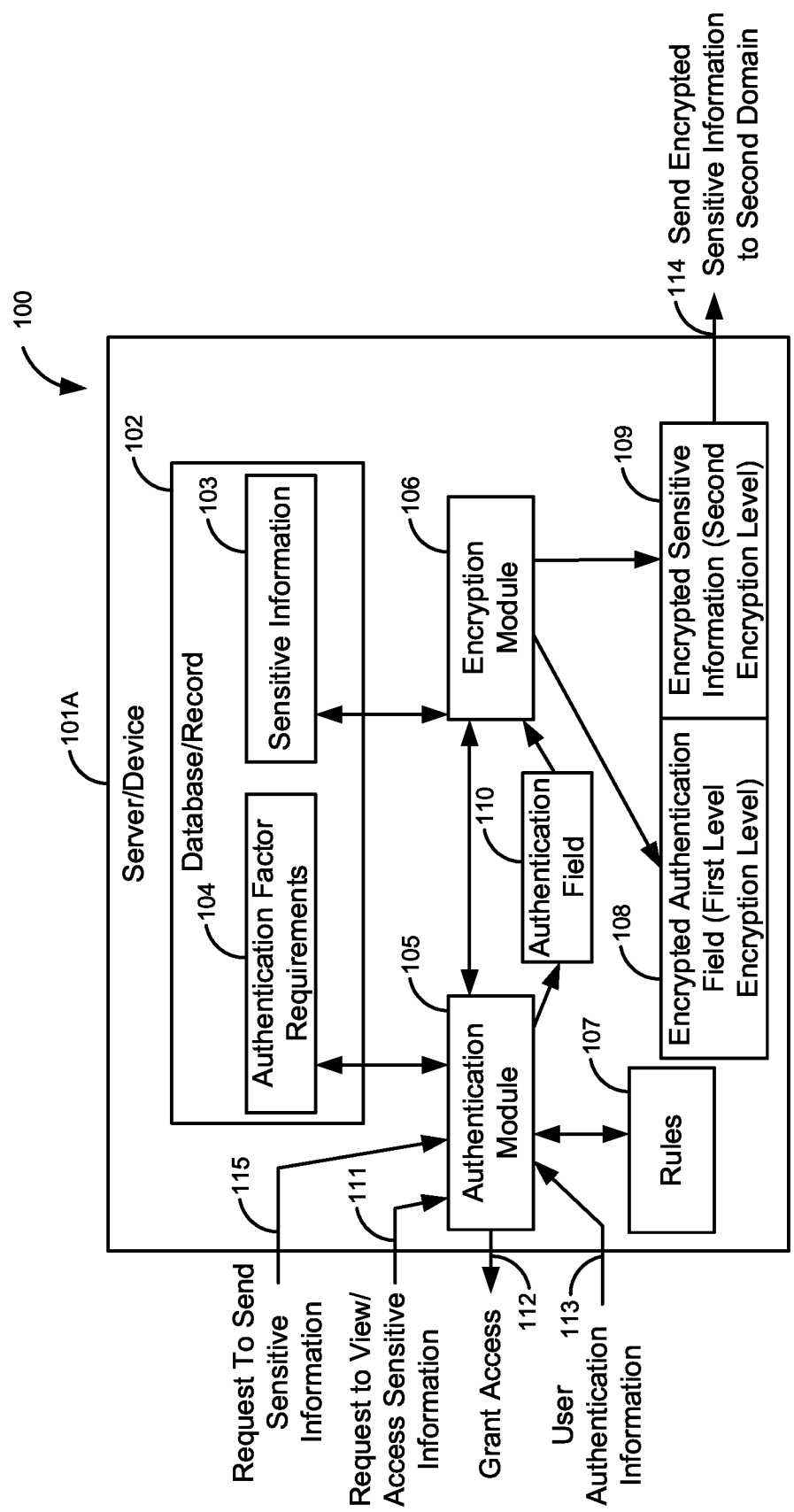
FIG. 1 is a block diagram of a first illustrative system for protecting sent sensitive information based on authentication factors.

FIG. 1 is a block diagram of a first illustrative system 100 for protecting sent sensitive information 103 based on authentication factors. The first illustrative system 100 comprises a server/device 101A.

A server/device 101 can be or may include any device that can communicate a network, such as a Personal Computer (PC), a telephone, a video system, a cellular telephone, a Personal Digital Assistant (PDA), a tablet device, a notebook device, a smartphone, a server, a gateway, router, a database server, an email server, a document storage server, an archive server, and/or the like. The server/device 101 comprises a database/record 102, an authentication module 105, an encryption module 106, rules 107, an encrypted authentication field 108, encrypted sensitive information 109, and an authentication field 110.

The database/record 102 may be a full database, a table in a database, a portion of a database, an individual record in a database, a file, a partition, a disk drive, a relational database, a directory service, an object-oriented database, and/or the like. The database/record 102 comprises sensitive information 103 and authentication factor requirements 104.

The sensitive information 103 may be any information that is deemed to be sensitive, such as, human resource records, user purchase records, credit information, top secret information, government records, medical records, billing information, patent records, trade secrets, software programming files, and/or the like. The sensitive information 103, depending on how sensitive it is, may require, any number of authentication factors to be accessed.

The authentication factor requirements 104 are record(s) that identifies what factors of authentication are required to access the sensitive information 103 in the current domain. The authentication factor requirements 104 may require a single authentication factor (e.g., any one of the available authentication factors), a specific of authentication factor (e.g., a username/password), a plurality of authentication factors (e.g., two or more authentication factors of any of the available authentication factors), a plurality of specific types of authentication factors (e.g., a username/password and a SMS confirmation code), a combination of the plurality of authentication factors/specific types of the plurality of authentication factors (e.g., a required username/password, and at least one of a fingerprint scan or an email confirmation code), and/or the like.

The authentication factor requirements 104 may link to an individual piece of sensitive information 103 (e.g., a credit card number), to a record (e.g., a user's information, such as username, address, social security number, credit card number, etc.), a group of records, a database, an application, and/or the like. The authentication factor requirements 104 may be stored in various manners, such as in an Extended Markup Language (XML) format, in a binary format, an in American Standard Code for Information Interchange ASCII format, and/or the like.

The authentication module 105 may be any hardware coupled with software that can authenticate a user. The authentication module 105 may handle a variety of authentication factors (e.g., any of those disclosed herein). The authentication module 105 may work in conjunction with a common trusted authority as described in FIG. 3.

The encryption module 106 is used to encrypt the sensitive information 103 and the authentication field 110 when the sensitive information 103 is set between two or more domains. The encryption module 106 may encrypt the sensitive information 103/authentication field 110 using various types of encryption, such as, Data Encryption Standard (DES), triple DES, Symmetric Encryption Algorithm (AES), Rivest, Shamir, and Aldeman (RSA) asymmetric encryption algorithm, and/or the like. The level of encryption may be based on various sizes of encryption keys, such as 56-bit, 64-bit, 128-bit, 256 bit, 512 bit, 1024 bit, and/or the like.

The rules 107 are used to define the authentication factor requirements 104, what information is considered sensitive information 103, user access rules, rules for sending the sensitive information 103, and/or the like. The rules 107 may be the same and/or different based on whether the sensitive information 103 is being accessed in the current domain or being sent to a second domain (i.e., a context). For example, if the current domain is considered secure, then only a single authentication factor (e.g., username/password) may be required to access the sensitive information 103 in the current domain. If the same sensitive information 103 is being sent to a less secure domain, the authentication requirements for the less secure domain may require a username/password and a biometric authentication factor. Even if the two domains are the same level of security, an entity (e.g., a corporation) may want to require additional authentication factors when the sensitive information 103 leaves the corporation's network. Alternatively, the rules 107 may require multi-factor authentication for local access and single factor authentication when the sensitive information 103 is sent to the second domain.

The rules 107 may be the same for both local access and being sent to the second domain. For example, if a username/password and a fingerprint scan is required locally, a username/password and fingerprint scan may be required in the second domain as well when the sensitive information is accessed by another user.

In one embodiment, specific type(s) of authentication factors may not be required. For example, the access may be based on any two types of authentication factors, such as, two or more of a username/password, a fingerprint scan, an iris scan, a SMS code, an email code, a palm print scan, a voiceprint, and/or the like.

When a request to view the sensitive information 103 is received in step 111, the authentication module 105 uses the authentication factor requirements 104 to determine if the user has provided the necessary authentication factors (the user authentication information 113) to access the sensitive information 103. If the user currently has the necessary number/type of authentication factors, the user is allowed to view the sensitive information 103 in step 112. The authentication factors may work in conjunction with permissions, such as, a security level. For example, the user may need to provide a username/password and a fingerprint scan, and have top secret group access to access the sensitive information 103.

The authentication factors may use other variables in conjunction with the authentication factors/permissions. For example, location/Global Positioning Satellite (GPS) information may be used in conjunction with authentication factors. If the user 310 is logged in at work (e.g., an internal user), a single factor authentication may be appropriate. If same user 310 is external (e.g., logging in from home), then two factor authentication may be needed to access the sensitive information 103. This can be extended to include using specific types of authentication methods based on location, device, and/or application.

If the user wants to send the sensitive information 103 to the second domain (e.g., send an email to a user outside of a corporation) in step 110, the authentication module 105 uses the rules 107 to determine how to instruct the encryption module 106 to encrypt the sensitive information 103. For example, the authentication module 105 may instruct the encryption module 106 to encrypt the sensitive information 103 using an RSA 128-bit encryption algorithm. The authentication module 105 also determines, based on the rules 107, what authentication factors are to be used by the second domain to view the encrypted sensitive information 109. The authentication module 105 generates the authentication field 110. The authentication field 110 defines the required authentication factors for the sensitive information 103. For example, the authentication field 110 may define specific type(s)/numbers of authentication factors that are required to access the encrypted sensitive information 109. The authentication field 110 may include additional information, such as, a security level (e.g., top security, medium security, low security, etc.). The security level may be used to provide a level of group access. For example, the authentication field 110 may define that only those users who have authenticated using a username/password and an iris scan, and have top security clearance can access the sensitive information 103.

The encryption module 106 encrypts the authentication field 110, based on the input from the authentication module 105, to produce the encrypted authentication field 108 using a first level of encryption. For example, the encrypted authentication field 108 may be encrypted using a 64 bit DES encryption algorithm. The encryption module 106 encrypts the sensitive information 103 using a second level of encryption. For example, the encrypted sensitive information 109 may be encrypted using AES 256-bit encryption. Although the above description describes the encrypted authentication field 108 using a lower level of encryption/type of encryption than the encrypted sensitive information 109, the encrypted authentication field 108 may be encrypted using the same encryption level and/or type. The encrypted authentication field 108 and the encrypted sensitive information 109 are then sent, by the server/device 101, in the first domain to the second domain in step 114.

In FIG. 1, although not shown, the sensitive information 103 and the authentication factor requirements 104 may be encrypted when stored in the database/record 102. When access is granted, the authentication factor requirements 104 and the sensitive information 103 are unencrypted.

Figure 2:
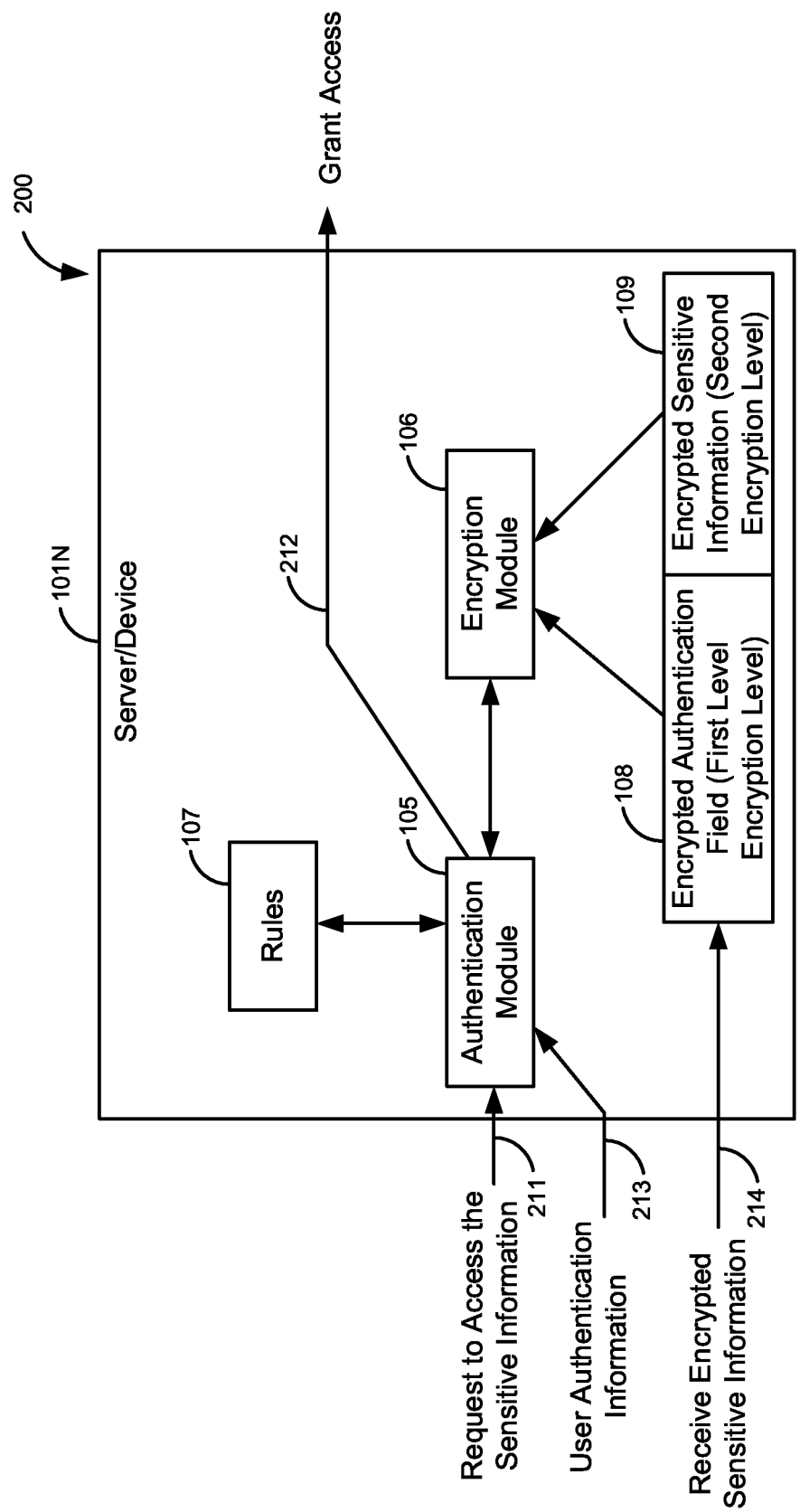
FIG. 2 is a block diagram of a second illustrate system for protecting received sensitive information based on authentication factors.

FIG. 2 is a block diagram of a second illustrate system 200 for protecting received sensitive information 103 based on authentication factors. The server/device 101N receives the encrypted authentication field 108/encrypted sensitive information 109 in step 212. For example, a user receives an email that has the encrypted sensitive information 109 (e.g., a document) as an attachment. The user requests to view the sensitive information 103 in step 210. The authentication module 105 unencrypts the encrypted authentication field 108 to determine the required authentication factors and/or the access level (e.g., top secret). For example, the authentication field 108 may specify that a username/password and SMS code are required to access the sensitive information 103 and that the user have top security access. The authentication module 105 gets the user authentication information in step 211 and access level from the rules 107 (or may be from the authentication field 110). If the user has authenticated using the required authentication factors and has the proper access level, the authentication module 105 instructs the encryption module 106 to unencrypt the encrypted sensitive information 109. The user is then granted access to the sensitive information 103 in step 213.

Figure 3:
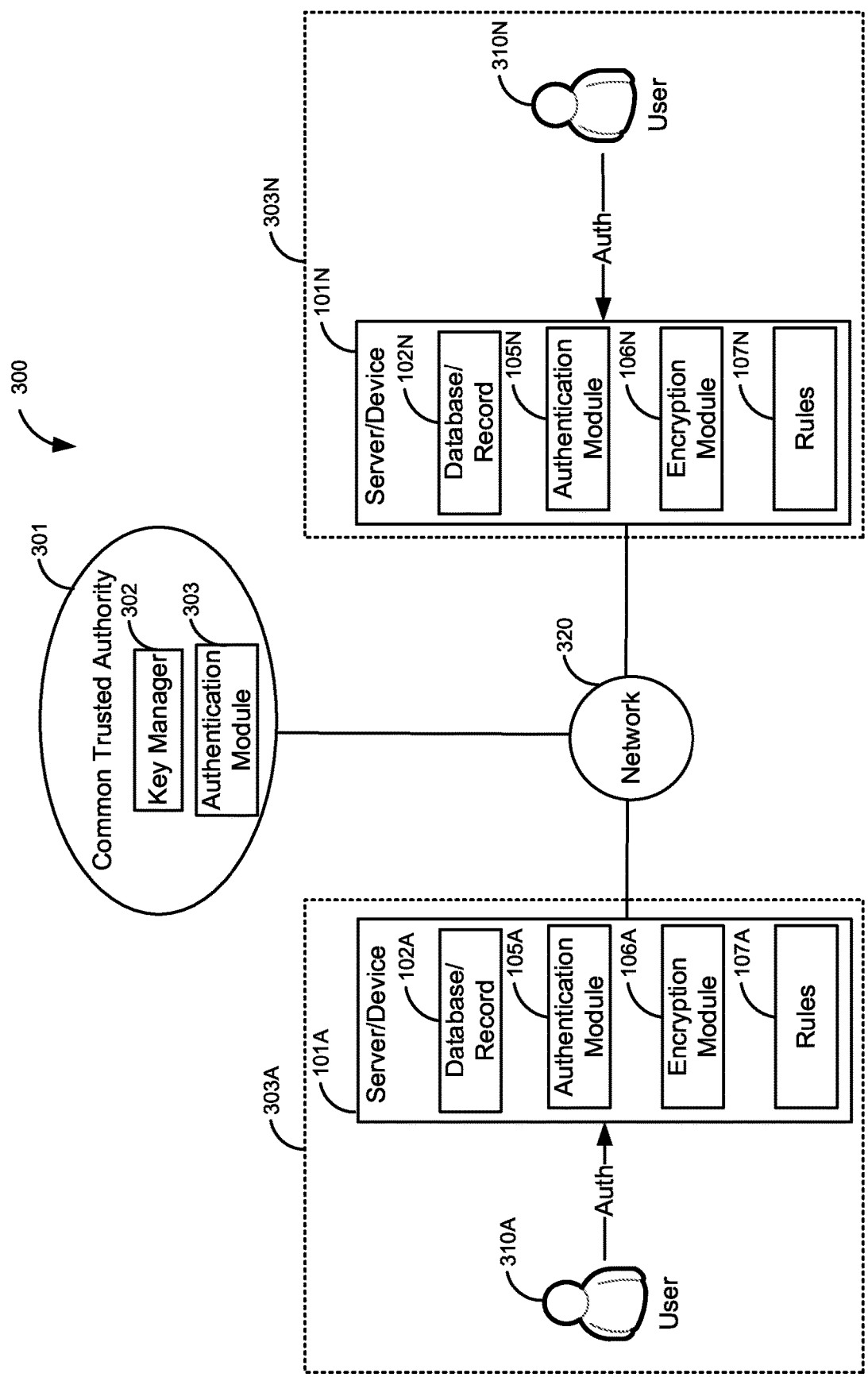
FIG. 3 is a block diagram of a system for protecting sensitive information using a common trusted authority.

FIG. 3 is a block diagram of a system 300 for protecting sensitive information 103 using a common trusted authority 301. The system 300 comprises the common trusted authority 301, domains 303A-303N, and a network 320.

The domains 303 comprise the server/devices 101A-101N. In addition, the domains 303A-303N have users 310A-310N. The domains 303A and 303N comprise the server/devices 101A-101N. There may be any number of domains 303A-303N in FIG. 3.

The common trusted authority 301 can be any trusted authority, such as, an authentication service, a cloud service, a key management service, a service provider, and/or the like. The common trusted authority 301 comprises a key manager 302 and an authentication module 303. The key manager 302 provides encryption keys to encrypt/unencrypt the sensitive information 103 between the domains 303A-303N. For example, when the user 310A wants to send the sensitive information 103 from the domain 303A to the domain 303N, upon providing the appropriate authentication factors, the key manager 302 provide the encryption keys to encrypt the authentication field 110 and the sensitive information 103. When the user 310N wants to view the encrypted sensitive information 109, upon verification of the proper authentication factors and/or security level the key manager 302 provides the encryption keys necessary for the user 310N access the sensitive information 103.

The authentication module 303 can be any hardware coupled with software that can provide authentication services between the domains 303A-303N. For example, the users 310A-310N may directly authenticate via the authentication module 303 (instead of using the authentication modules 105A-105N) using the necessary authentication factors to get access the sensitive information 103 within a domain (e.g., domain 303A) and/or when the sensitive information 103 is sent between the domains 303A-303N as encrypted sensitive information 109.

In one embodiment, the authentication modules 105A-105N may work in conjunction with the authentication module 303. In this embodiment, the authentication modules 105A-105N may provide the authentication information to the authentication module 303. The authentication module 303 then works with the key manager 302 to provide the necessary encryption keys to allow the users 310A-310N to access the sensitive information 103. Although not show, the common trusted authority 301 may also have rules 107 that are used to determine the authentication factors/security levels required for granting access to the sensitive information 103.

In one embodiment, the keys used may be based on Micali encryption (e.g., see https://en.wikipedia.org/wiki/Goldwasser%E2%80%93Micali_cryptosystem, which is incorporated herein by reference). In this exemplary embodiment, the encryption keys used to decrypt the encrypted sensitive information 109 for the number of authentication factors may be separate fragments of a larger encryption key. Different users 310 may receive different fragments of the larger key to encrypt/unencrypt the sensitive information 103/authentication field 110. Even though the different users 310 may have different key fragments, Micali encryption allows for the encrypted sensitive information 109 to be decrypted based on the key fragments.

In FIG. 3, for the integrity of the security controls to be viable, the authentication modules 105A-105N and encryption modules 106A-106N would have to be tamper resistant as would the key exchange mechanism of the common trusted authority 301. The key exchange mechanism can be accomplished by existing mechanisms, such as Diffie-Hellman. The tamper resistance can be accomplished by environmental technology, which validates the application. The validation may be an application digital signature check prior to execution, or by the authentication modules 105A-105N/303 performing a validation and authorization test. The authorization test may run in the environment and look at the measurements in an internal Trusted Platform Module (TPM), or by looking for an enabling key, or a local digital signature on a certificate associated with the system 100. If the program was allowed to execute, the program could then look to see if it was modified by validating its digital signature. Since this is not foolproof the mechanism, the process could also include information in an authorization package that can be validated against (i.e., the authorization certificate could contain information which could be used to self-validate (i.e., a hash to compare against)).

The network 320 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 320 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 320 is an electronic communication network configured to carry messages via packets and/or circuit switched communications. The network 320 connects the domains 303A-303N with the common trusted authority 301.

Figure 4:
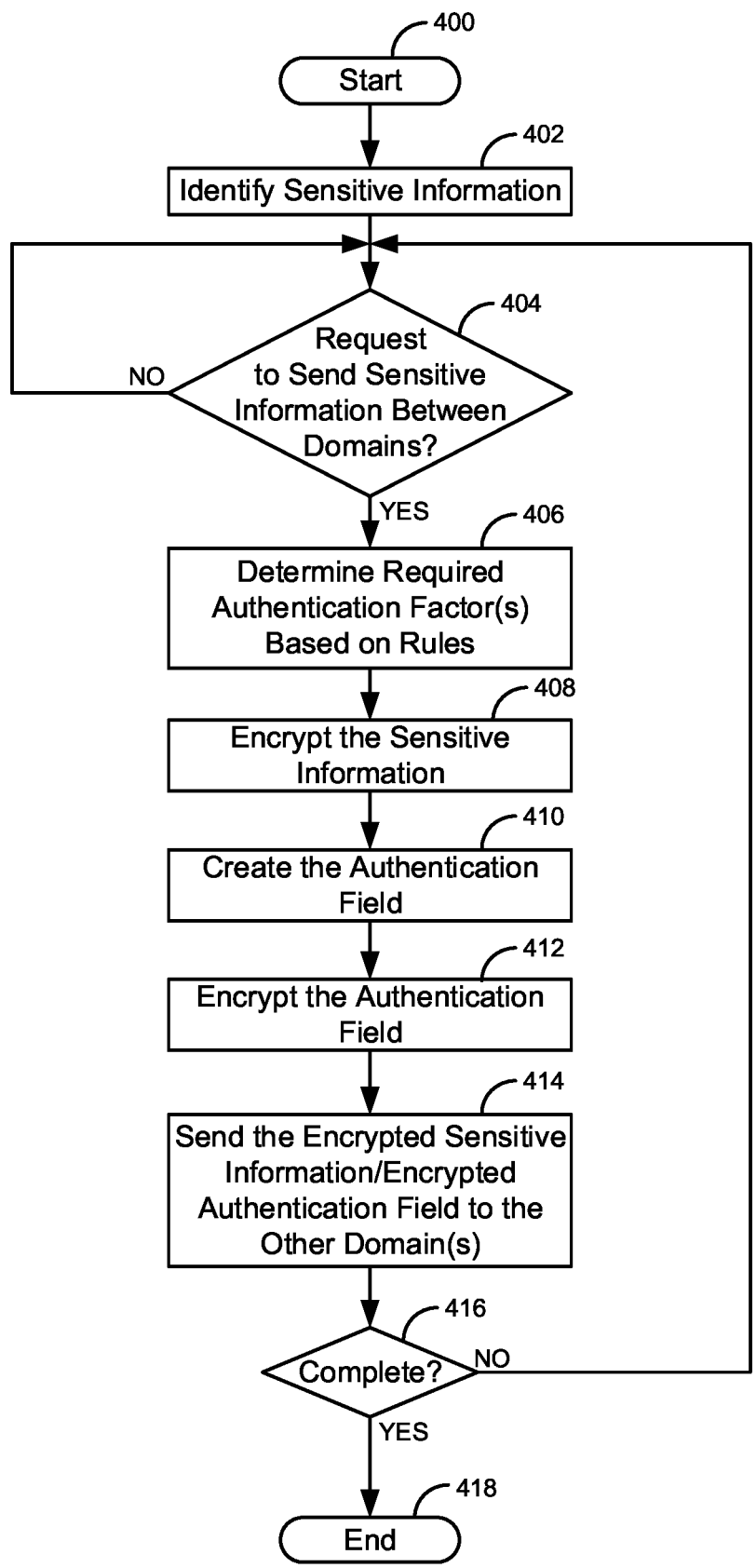
FIG. 4 is a flow diagram of a process for protecting sent sensitive information based on authentication factors.

FIG. 4 is a flow diagram of a process for protecting sent sensitive information 103 based on authentication factors. Illustratively, the server/devices 101A-101N, the database/records 102A-102N, the authentication modules 105A-105N, the encryption modules 106A-106N, the rules 107A-107N, the common trusted authority 301, the key manager 302, and the authentication module 303 are stored-program-controlled entities, such as a computer or microprocessor, which performs the method of FIGS. 4-7 and the processes described herein by executing program instructions stored in a computer readable storage medium, such as a memory (i.e., a computer memory, a hard disk, and/or the like). Although the methods described in FIGS. 4-7 are shown in a specific order, one of skill in the art would recognize that the steps in FIGS. 4-7 may be implemented in different orders and/or be implemented in a multi-threaded environment. Moreover, various steps may be omitted or added based on implementation.

The process starts in step 400. The authentication module 105 identifies the sensitive information 103 in step 402. The authentication module 105 may identify the sensitive information 103 in various ways, such as, based on an administration, based on the authentication factor requirements 104, based on the rules 107, based on a tag in the database/record 102, and/or the like. The authentication module 105 may identify the sensitive information 103 in step 402 separately from the other steps of FIG. 4. For example, the sensitive information 103 may be identified using a separate thread.

The authentication module 105 waits, in step 404, for a request to send sensitive information 103 between the domains 303A-303N. The request could be a request to send the sensitive information 103 to multiple domains 303. For example, an email with the sensitive information may be sent to multiple users 310 in multiple domains 303. If a request has not been received in step 404, the process of step 404 repeats. If there is a request to send the sensitive information 103 between the domains 303A-303N, the authentication module 105 determines, in step 406, the required authentication factors and/or security levels based on the rules 107.

The encryption module 106 encrypts the sensitive information 103 in step 408. The authentication module 105 creates the authentication field 110 in step 410. For example, if there is a single record in the sensitive information, the authentication field 110 may be similar to what is shown in Table 1 below.

TABLE 1

(Authentication Field)

| Authentication Factor(s) | Authentication Type | Record Number | Record Security Level |
|---|---|---|---|
| Username/password | Fixed | 1 | None |
| Biometric | Any Available Biometric | 1 | None |

In Table 1, the record requires two authentication factors: 1) a username/password, and 2) a biometric (any available biometric). In Table 1, the authentication field 110 does not require a security level (e.g., for group access). The authentication field 110 may be different based on the sensitive information 103, a context of the current domain 303, a context of the receiving domain 303 and/or the like. For example, if the sensitive information 103 comprises multiple records with different levels of sensitivity (e.g., a username (lower sensitivity), an address (medium sensitivity), and credit card number (higher sensitivity), the authentication field 110 can have separate authentication factors associated with each record of the sensitive information 103. Table 2 shows an exemplary example of the authentication field 110 where record 1 is the username, record 2 is the address, and record three is the credit card information. In addition, each record has an associated record security level.

TABLE 2

(Authentication Field)

| Authentication Factor | Authentication Type | Record Number | Record Security Level |
|---|---|---|---|
| Username/password | Fixed | 1 | 1 |
| Username/password | Fixed | 2 | 2 |
| Fingerprint Scan | Fixed | 2 | 2 |
| Username/password | Fixed | 3 | 3 |
| Fingerprint Scan | Fixed | 3 | 3 |
| Iris Scan | Fixed | 3 | 3 |

As one of skill in the art would recognize, there may be various ways the authentication field 110 may be structured. For example, the order may be different or there may be additional or less fields based on implementation.

The encryption module 106 encrypts the authentication field 110 in step 412. The level/type of the encryption of the sensitive information 103 and the authentication field 110 may be the same or different. For example, the additional field 110 may be encrypted at a lower level of encryption (e.g., DES 64) and the sensitive information 103 may be encrypted using DES 256. The additional field 110 may use a different type of encryption (e.g., DES 256) than the sensitive information 103 (e.g., SHA 256). The additional field 110 may use the same type of encryption (e.g., SHA 256) as the sensitive information 103. In this embodiment, the additional field 110 will use a different encryption key than the sensitive information 103. The authentication module 105 sends, in step 414, the encrypted sensitive information 109 and the encrypted authentication field 108 to the other domain(s) 303.

The authentication module 105 determines, in step 416, if the process is complete. If the process is not complete in step 416, the process goes to step 404. Otherwise, if the process is complete in step 416, the process ends in step 418.

Although not shown in FIG. 4, the authentication module 105 can track the sensitive information 103 as it moves within the same domain 303. For example, the user 310A copies-and-pastes or cuts-and-pastes the social security number (sensitive information 103) into a document (still in the user's domain 303). When the copy-and-paste/cut-and-paste is made, the authentication factor requirements 104 also become associated with the document. In one embodiment, the access is at the document level; however, the access could be at a lower level (e.g., a paragraph level within the document). In other words, the user 310A could not view the paragraph in the document unless having authenticated using appropriate number of authentication factors. In one embodiment, the document or the paragraph would now be encrypted based on the required authentication level. This can include using a stronger level of encryption based on how sensitive the information is.

This concept can be extended further to include a multi-user operating system. For a copy-and-paste/cut-and-paste, the operating system will not allow "clipboard" information to be leaked between users 103 on the multi-user operating system. A second user 103 trying to access the clipboard information would be restricted according to the originally required authentication factors/access permissions when the sensitive information 103 was copied to the clipboard. This can also be applied to pipes, sockets, streams, a video conference (e.g., where the sensitive information 103 is shared visually), etc. The concept can apply to any level in the software stack (i.e., the Operating Systems Interconnect (OSI) model) that can replicate the sensitive information 103.

Figure 5:
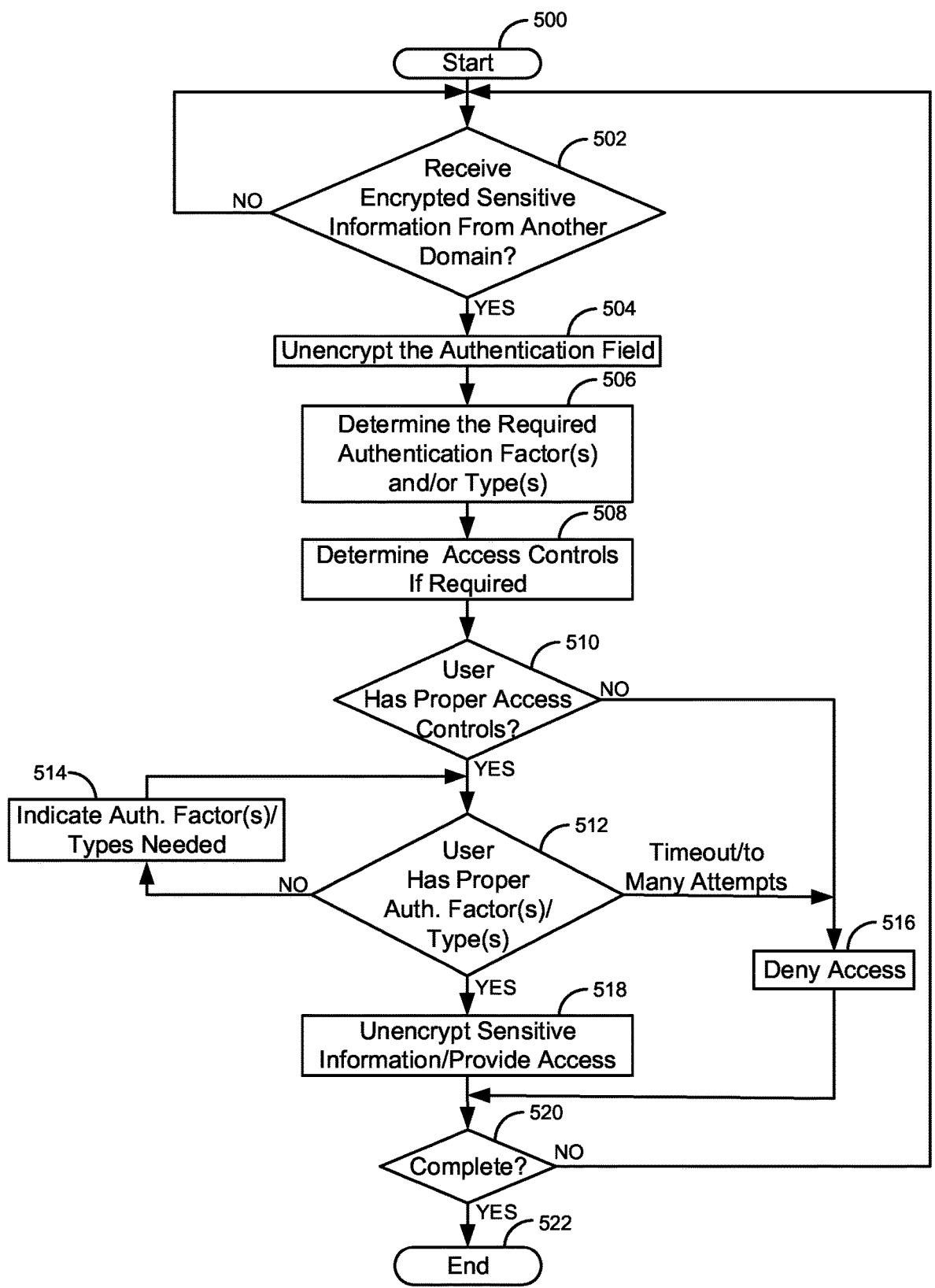
FIG. 5 is a flow diagram of a process for protecting received sensitive information based on authentication factors.

FIG. 5 is a flow diagram of a process for protecting received sensitive information 103 based on authentication factors. The process starts in step 500. The authentication module 105 waits, in step 502, to receive the encrypted authentication field 108/encrypted sensitive information 109. If the encrypted authentication field 108/encrypted sensitive information 109 is not received in step 502, the process of step 502 is repeated. If the encrypted authentication field 108/encrypted sensitive information 109 is received in step 502, the encryption module 106 unencrypts the encrypted authentication field 108 in step 504. The authentication module 105 determines, in step 506, the required authentication factors/types. The authentication module 105 determines, in step 508, if the required access controls.

The authentication module 105 determines, in step 510, if the user 310 has the proper access controls. For example, the authentication module 105 determines if the user 310 is part of the group that can access top secret information. If the user 310 does not have proper access controls in step 510, the user 310 is denied access in step 516 and the process goes to step 520. If the user 310 has the proper access controls in step 510, the authentication module 105 determines, in step 512, if the user 310 has authenticated using the proper authentication factors/types. If the user 310 has not authenticated using the proper authentication factors/ types in step 512, a message is sent to the user 310 that indicates the authentication factors/types need in step 514. For example, if the user 310 has only authenticated using a username/password and the required authentication factors also require a fingerprint scan, the message of step 514 will indicate that the user 310 will need to also provide a fingerprint scan to access the sensitive information 103. The process then goes back to step 512.

If the user 310 has not authenticated within a timeout period or has made too many attempts to authenticate in step 512, the user 310 is denied access in step 516 and the process goes to step 520. Otherwise, if the user 310 has authenticated using the required authentication factors/types in step 512, the encryption module 106 unencrypts the encrypted sensitive information 109 and provides access to the sensitive information 103 in step 518.

The authentication module 105 determines, in step 520, if the process is complete. If the process is not complete in step 520, the process goes to step 502. Otherwise, if the process is complete in step 520, the process ends in step 522.

Figure 6:
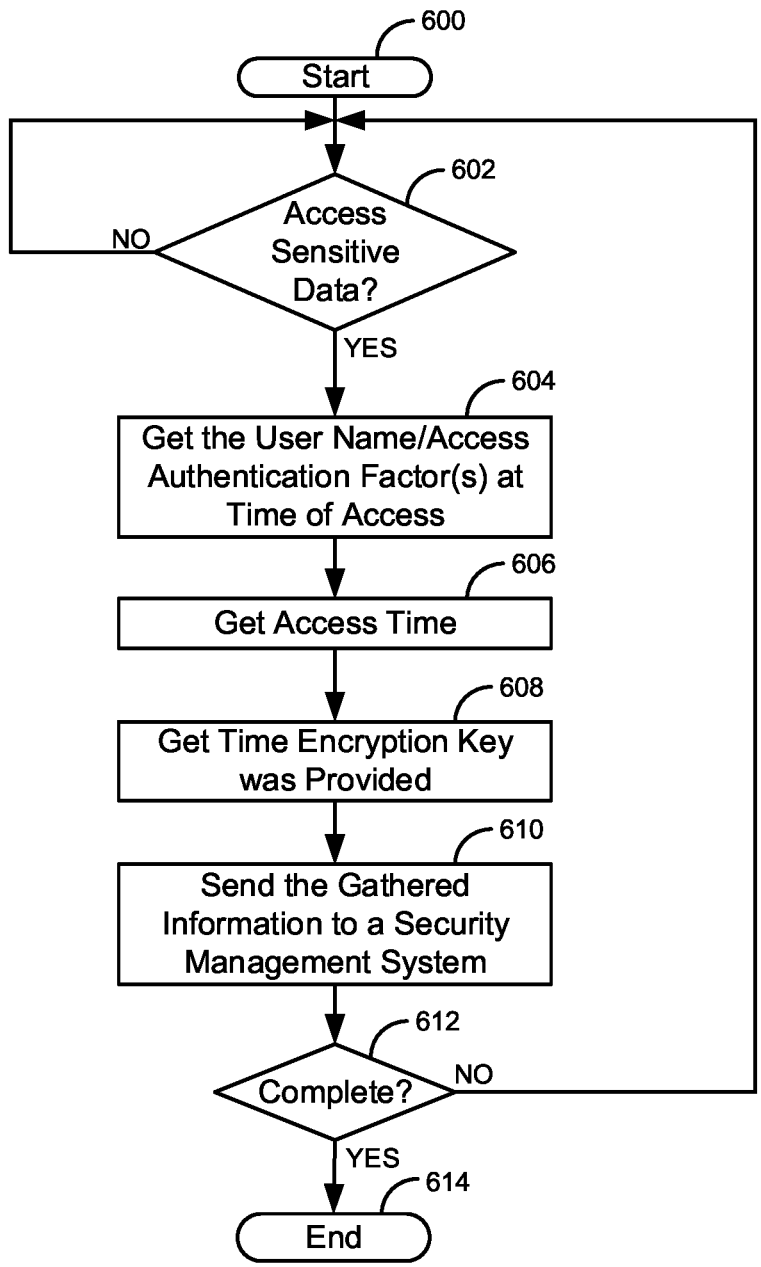
FIG. 6 is a flow diagram of a process for tracking access to sensitive information.

FIG. 6 is a flow diagram of a process for tracking access to sensitive information 103. The process starts in step 600. The authentication module 105 determines, in step 602, if access has been granted to the sensitive information 103. If access has not been granted to the sensitive information 103, the process of step 602 repeats. If access has been granted in step 602, the authentication module 105 gets the accessing user's name and the authentication factors used at the time of access in step 604. The authentication module 105 gets the access time in step 606. The authentication module 105 gets the time the encryption key was provided in step 608. For example, the encryption key may be provided when the user 310 logs in with the necessary authentication factors and the access time may be several hours later when the user 310 access a specific record in a database. The authentication module 105 sends the gathered information to a security management system in step 610. The security management system may be part of the common trusted authority 301, a network management system, a security management system, and/or the like. The security management system tracks the sensitive information 103 as it traverses the domains 303A-303N.

A map can be created and displayed to a user 310 (e.g., using a cybersecurity application) based on the gathered information sent in step 610. The map may show how/when the sensitive information 103 is accessed and sent between users 310, devices 101, applications, and/or domains 303. This may be useful for applications were tracking access/ copying of sensitive information 103 is critical, such as, government applications. In addition, the map can also include where sensitive information 103 is leaked. In this case, an administrator may be notified of the potential security breach. Machine learning can be applied to identify anomalies based on training data. An exemplary map is shown in FIG. 7.

The authentication module 105, determines, in step 612, if the process is complete. If the process is not complete in step 612, the process goes back to step 602. Otherwise, if the process is complete in step 612, the process ends in step 614.

Figure 7:
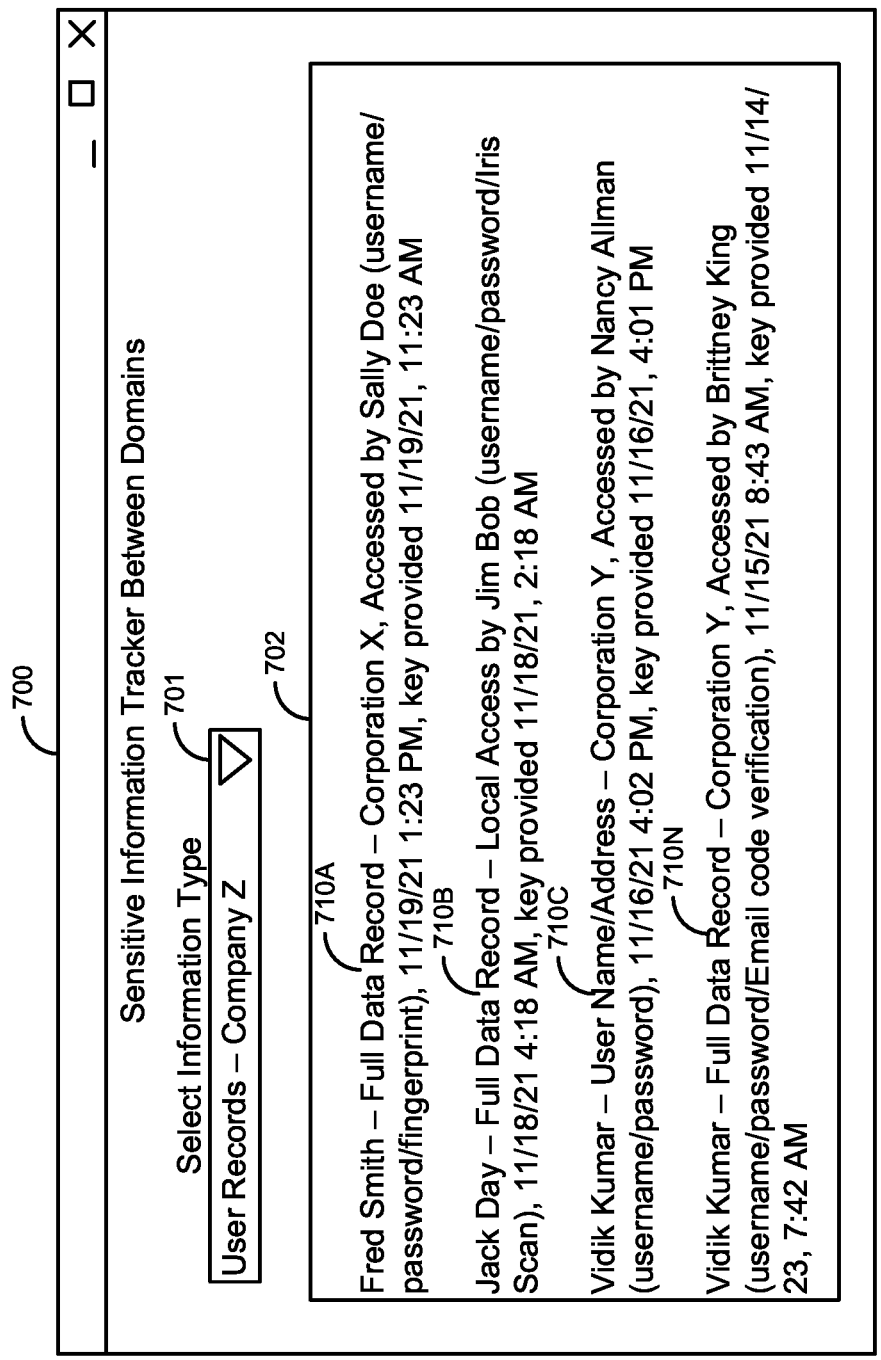
FIG. 7 is a diagram of a display of a map that tracks sensitive information.

FIG. 7 is a diagram of a display of a map 700 that tracks sensitive information 103. The map 700 is an exemplary map 700 used to display access information to the sensitive information 103 of individual user records. In FIG. 7, the domains 303 are between multiple corporations. The map 700 comprises a select menu 701 and an access list 702. The selected menu allows a user 310 to select specific records to track in the access list. In FIG. 7, the user 310 has selected the menu item "User Records—Company Z."

As a result of the selection of the menu 701, sensitive information records 710A-710N are displayed to the user 310. The sensitive information record 710A indicates that Fred Smith's full data record was accessed by Corporation X user 310 Sally Doe who provided a username/password/ fingerprint. The access date/time was 11/19/21 at 1:23 PM. The access key was provided 11/19/21 at 11:23 AM. The sensitive information record 710B indicates that Jack Day's full data record was accessed locally by the user 310 Jim Bob who provided a username/password/iris scan. The access date/time was 11/18/21 at 4:18 AM. The access key was provided 11/18/21 at 2:18 AM. The sensitive information record 710C indicates that Vidik Kumar's username/ address was accessed by Corporation Y user 310 Nancy Allman who provided a username/password. Only a single authentication factor was used because the sensitive information 103 of the record that was accessed is less sensitive. The access date/time was 11/16/21 at 4:02 PM. The access key was provided 11/16/21 at 4:01 PM. The sensitive information record 710N indicates that Vidik Kumar's full data record was accessed by Corporation Y user 310 Brittney King who provided a username/password/email verification code. A multi-factor authentication is required because the sensitive information 103 that was accessed is more sensitive. The access date/time was 11/15/21 at 8:43 AM. The access key was provided 11/14/21 at 7:42 AM.

The map 700 may be used to identify leaks of the sensitive information 103. For example, because the map 700 shows what data was accessed with what authentication factors, a user 310 may be able to identify potential data leaks where the sensitive information 103 was accessed without the proper authentication factors.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that can supply and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

Several variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the function, and the software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to standards and protocols, the disclosure is not limited to such standards and protocols. Other similar standards and protocols not mentioned herein are in existence and are included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a non-transitory computer readable medium, coupled with the microprocessor and comprising microprocessor readable and executable instructions that, when executed by the microprocessor, cause the microprocessor to:
receive a request to send sensitive information from a first domain to a second domain;
encrypt the sensitive information, wherein the encrypted sensitive information comprises an authentication field, wherein the authentication field identifies a combination of a plurality of types of authentication factors required to access the sensitive information, and wherein the combination of the plurality of types of authentication factors required are-is determined based on a context of the request;
wherein encrypting the sensitive information comprises encrypting the authentication field using a first level of encryption and encrypting the sensitive Information using a second level of encryption, and wherein the second level of encryption is higher than the first level of encryption; and
send the encrypted sensitive information to the second domain.

2. The system of claim 1, wherein the one or more types of authentication factors are one of:
a single type of authentication factor;
a specific type of the authentication factor;
a plurality of types of authentication factors;
a plurality of specific types of a plurality of authentication factors; or
a combination of the plurality of types of authentication factors and the plurality of specific types of the plurality of authentication factors.

3. The system of claim 1, wherein the context of the request comprises whether the request is from a secure domain or an unsecured domain, and wherein a combination of the plurality of types of authentication factors required for the request from the secure domain are different from a combination of the plurality of types of authentication factors required for the request from the unsecured domain.

4. The system of claim 1, wherein encrypting the sensitive information comprises encrypting the sensitive information in the first domain using a first key fragment of a larger encryption key, and wherein the encrypted sensitive information is decrypted in the second domain using a second key fragment of the larger encryption key.

5. The system of claim 1, wherein the microprocessor readable and executable instructions further cause the microprocessor to:
track the sensitive information between the first domain and the second domain; and
generate a map that shows at least one of: what types of authentication factors were used to access the encrypted sensitive information in the second domain, who accessed the encrypted sensitive information in the second domain, a time the encrypted sensitive information was accessed in the second domain, and a time an encryption key was provided to access the sensitive information in the second domain.

6. The system of claim 1, wherein the sensitive information comprises a plurality of sensitive information records, and wherein the authentication field identifies a plurality of the one or more types of authentication factors for the plurality of sensitive information records.

7. The system of claim 1, wherein the sensitive information comprises a plurality of sensitive information records, wherein the authentication field identifies a single type of authentication factor for a first record of the plurality of sensitive information records, and wherein the authentication field identifies a plurality of types of authentication factors for a second record of the plurality of sensitive information records.

8. The system of claim 1, wherein the sensitive information is copied from an original copy of the sensitive information within the first domain, and wherein the sensitive information is assigned the one or more types of authentication factors based on the one or more types of authentication factors being assigned to the original copy of the sensitive information.

9. A method comprising:
receiving, by a microprocessor, a request to send sensitive information from a first domain to a second domain;
encrypting, by the microprocessor, the sensitive information, wherein the encrypted sensitive information comprises an authentication field, wherein the authentication field identifies a combination of a plurality of types of authentication factors that are required to access the sensitive information, and wherein the combination of the plurality of types of authentication factors is determined based on a context of the request;
wherein encrypting the sensitive information comprises encrypting the authentication field using a first level of encryption and encrypting the sensitive information using a second level of encryption, and wherein the second level of encryption is higher than the first level of encryption; and
sending, by the microprocessor, the encrypted sensitive information to the second domain.

10. The method of claim 9, wherein the one or more types of authentication factors are one of:
a single type of authentication factor;
a specific type of the authentication factor;
a plurality of types of authentication factors;
a plurality of specific types of a plurality of authentication factors; or
a combination of the plurality of types of authentication factors and the plurality of specific types of the plurality of authentication factors.

11. The method of claim 9, wherein the context of the request comprises whether the request is a secure domain or an unsecured domain, and wherein the one or more types of authentication factors required for the request from the secure domain are different from the one or more types of authentication factors required for the request from the unsecured domain.

12. The method of claim 9, wherein encrypting the sensitive information comprises encrypting the sensitive information in the first domain using a first key fragment of a larger encryption key, and wherein the encrypted sensitive information is decrypted in the second domain using a second key fragment of the larger encryption key.

13. The method of claim 9, further comprising:
tracking the sensitive information between the first domain and the second domain; and
generating a map that shows at least one of: what types of authentication factors were used to access the encrypted sensitive information in the second domain, who accessed the encrypted sensitive information in the second domain, a time the encrypted sensitive information was accessed in the second domain, and a time an encryption key was provided to access the sensitive information in the second domain.

14. The method of claim 9, wherein the sensitive information comprises a plurality of sensitive information records, and wherein the authentication field identifies a plurality of the one or more types of authentication factors for the plurality of sensitive information records.

15. The method of claim 9, wherein the sensitive information comprises a plurality of sensitive information records, wherein the authentication field identifies a single type of authentication factor for a first record of the plurality of sensitive information records, and wherein the authentication field identifies a plurality of types of authentication factors for a second record of the plurality of sensitive information records.

16. A system comprising:
a microprocessor; and
a non-transitory computer readable medium, coupled with the microprocessor and comprising microprocessor readable and executable instructions that, when executed by the microprocessor, cause the microprocessor to:
receive encrypted sensitive information;
unencrypt an authentication field in the encrypted sensitive information, wherein the authentication field identifies a combination of a plurality of types of authentication factors that are required to access the encrypted sensitive information, and wherein the combination of the plurality of types of authentication factors is determined based on a context of a request for sensitive information;
determine, by looking at the authentication field, the combination of the plurality of types of authentication factors required to access the encrypted sensitive information;
determine if a user who received the encrypted sensitive information has authenticated using the combination of the plurality of types of authentication factors; and
in response to the user who received the encrypted sensitive information having authenticated using the combination of the plurality of types of authentication factors, unencrypt the encrypted sensitive information.

17. The system of claim 16, wherein determining if the user who received the encrypted sensitive information has authenticated using the combination of the plurality of types of authentication factors is determined by a common trusted authority, and wherein the common trusted authority provides an encryption key to unencrypt the encrypted sensitive information based on the user authenticating using the combination of the plurality of types of authentication factors.

18. The system of claim 16, wherein the context of the request comprises an application requesting the sensitive information.

* * * * *